United States Patent
Cooper

[15] 3,674,067
[45] July 4, 1972

[54] TIRE CHUCKING DEVICE

[72] Inventor: Donno W. Cooper, Muncie, Ind. 47304
[73] Assignee: International Rubber Industries, Inc., Jefferson, Ky.
[22] Filed: April 16, 1970
[21] Appl. No.: 29,043

[52] U.S. Cl. ..........................144/288 A, 18/2 TP, 18/2 TT
[51] Int. Cl. .....................................B29h 21/00, B60c 25/00
[58] Field of Search ..............144/288 A; 157/1, 13; 18/2 TP, 18/2 TT

[56] References Cited

UNITED STATES PATENTS

| 3,258,044 | 6/1966 | Miller | 144/288 A |
|---|---|---|---|
| 3,219,077 | 11/1965 | Wright | 144/288 A |

*Primary Examiner*—Theron E. Condon
*Assistant Examiner*—Neil Abrams
*Attorney*—Berman, Davidson and Berman

[57] ABSTRACT

An air-operated tire chucking device consisting of a mandrel on which front and rear tire bead-engaging discs are slidably mounted. A removable stop key on the mandrel limits movement on the front disc. The rear disc has a cylinder which receives a stationary piston, defining an expansible primary chamber. With a tire between the discs, compressed air is admitted into this primary chamber, forcing the rear and front discs against the tire beads and thus forming a contact seal for inflation of the tire. As the rear disc reaches a predetermined position, a valve element carried thereby contacts the front disc and exposes a valve port in the rear disc, allowing air to exit from the primary chamber and fill the tire, the tire and discs now forming a secondary chamber. The tire continues to inflate until the air pressure in the tire forces the rear disc back and the valve element loses contact with the front disc and closes the inflation valve. The tire is released by venting the primary chamber, whereby the pressure in the tire overcomes the pressure in the primary chamber, forcing the rear disc rearwardly and causing a tire vent valve carried thereby to open, thus releasing the air from the tire.

12 Claims, 5 Drawing Figures

PATENTED JUL 4 1972

INVENTOR.
DONNO W. COOPER,
BY
Berman, Davidson & Berman,
ATTORNEYS.

PATENTED JUL 4 1972 3,674,067

INVENTOR.
DONNO W. COOPER,
BY
Berman, Davidson & Berman,
ATTORNEYS.

TIRE CHUCKING DEVICE

This invention relates to tire supporting and inflating apparatus, and particularly to an air-operated tire chucking device of the type employing a pair of bead-engaging discs which are movable into engagement with the bead portions of a tire to be supported by the device.

A main object of the invention is to provide a novel and improved air-operated tire chucking device which is substantially simpler in construction with respect to inflation control than prior devices employed for the same purpose, which provides quicker bead sealing and which provides faster inflation than said prior devices.

A further object of the invention is to provide for safe operation. All devices of this type require greater pressure to operate the device than the pressure simply necessary to inflate the tire. Therefore, it is necessary to provide a means of converting high pressure which is dangerous to lower pressures suitable for safe inflation of a tire. Prior devices use pressure regulators to convert the higher pressure to the lower pressure. However, pressure regulators are subject to failure, which can cause the inflation pressure of the tire to rise to dangerous levels. The present invention avoids the use of a pressure regulator by use of a balance of forces between the primary chamber and the secondary chamber. The present invention is constructed so that the achievement of an improper balance of forces, that is, a potentially dangerous high pressure in the tire, results in the secondary chamber being vented mechanically, automatically, reliably and safely.

A further object of the invention is to provide an air-operated tire chucking device which involves inexpensive components, which is reliable in operation, and which is particularly adaptable to support new tires during building, or for inflation of uncured new tires during building or for inflation of new tires after molding, or for buffing and performing building operations on retreadable tires.

A still further object of the invention is to provide an improved tire chucking device which is compact in size, which involves only a few parts, which is safe to use, and which provides automatic regulation of the inflation pressure in a tire.

A still further object of the invention is to provide an improved tire chucking device for supporting and inflating a tire for the purposes of inspecting, cleaning and performing other operations thereon, the device having automatically operated means to admit air into the interior of the tire after it has been securely clamped in the device, and the device being provided with means for easily and safely deflating the tire when it is to be removed.

A still further object of the invention is to provide an improved tire supporting and inflating device which is very economical to operate, which can operate efficiently for long periods of time and which employs the same air supply to clamp a tire therein and to thereafter to inflate the tire.

Further objects and advantages of the invention will become apparent from the following description and claims, and from the accompanying drawings, wherein:

Figure 1:
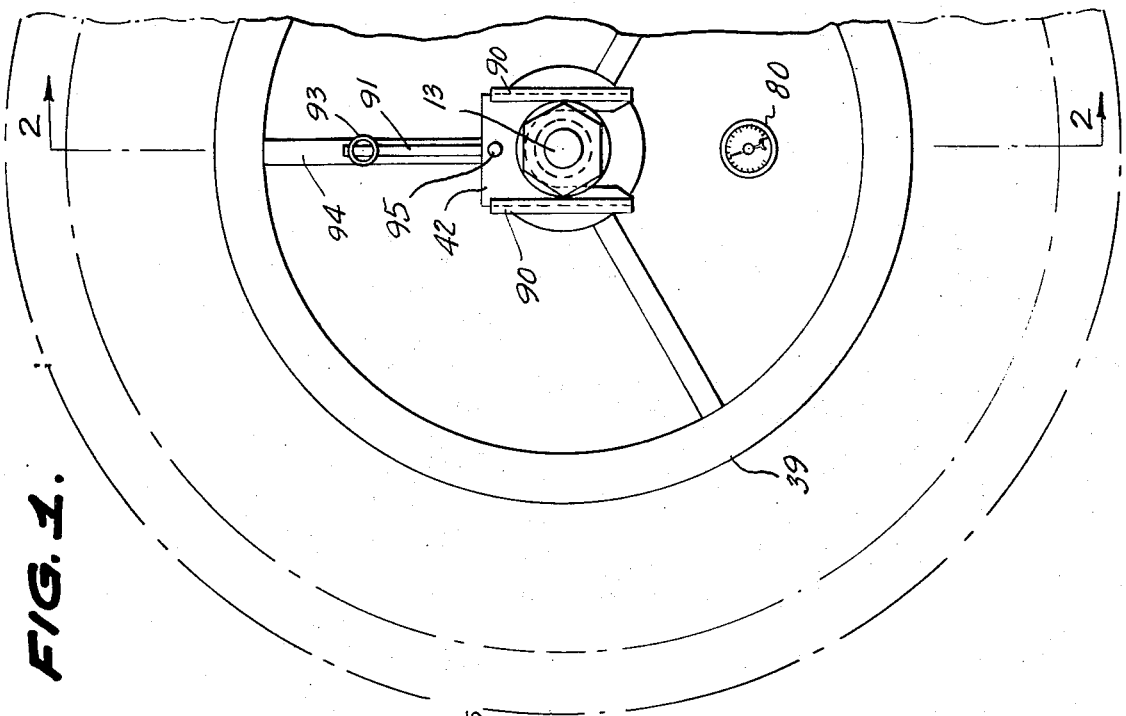
FIG. 1 is a fragmentary front elevational view of a tire mounted in an improved tire chucking device constructed in accordance with the present invention.

Referring to the drawings, 11 generally designates an improved air-operated tire supporting and inflating device constructed in accordance with the present invention. The device 11 comprises a vertical upstanding supporting post 12 on the top end of which is mounted a pair of axially aligned bearing assemblies 15 and 15' in which is journaled a horizontally extending supporting shaft 13. Thus, the rear portion of the shaft 13 is rotatably supported on the top end of the upstanding member 12 by means of the spaced bearings 15, 15'. Rigidly secured to a top flange 12' provided on the post member 12 adjacent the forward bearing assembly 15' is a vertical plate member 16. Secured to said plate member around the shaft 13 by a plurality of fastening bolts 17 is an annular cup member 18 which is sealed relative to shaft 13 by suitable resiliently deformable sealing rings 19 disposed in suitable annular seats formed in the central bore of the cup member 18 and sealingly engaging the shaft 13.

Figure 2:
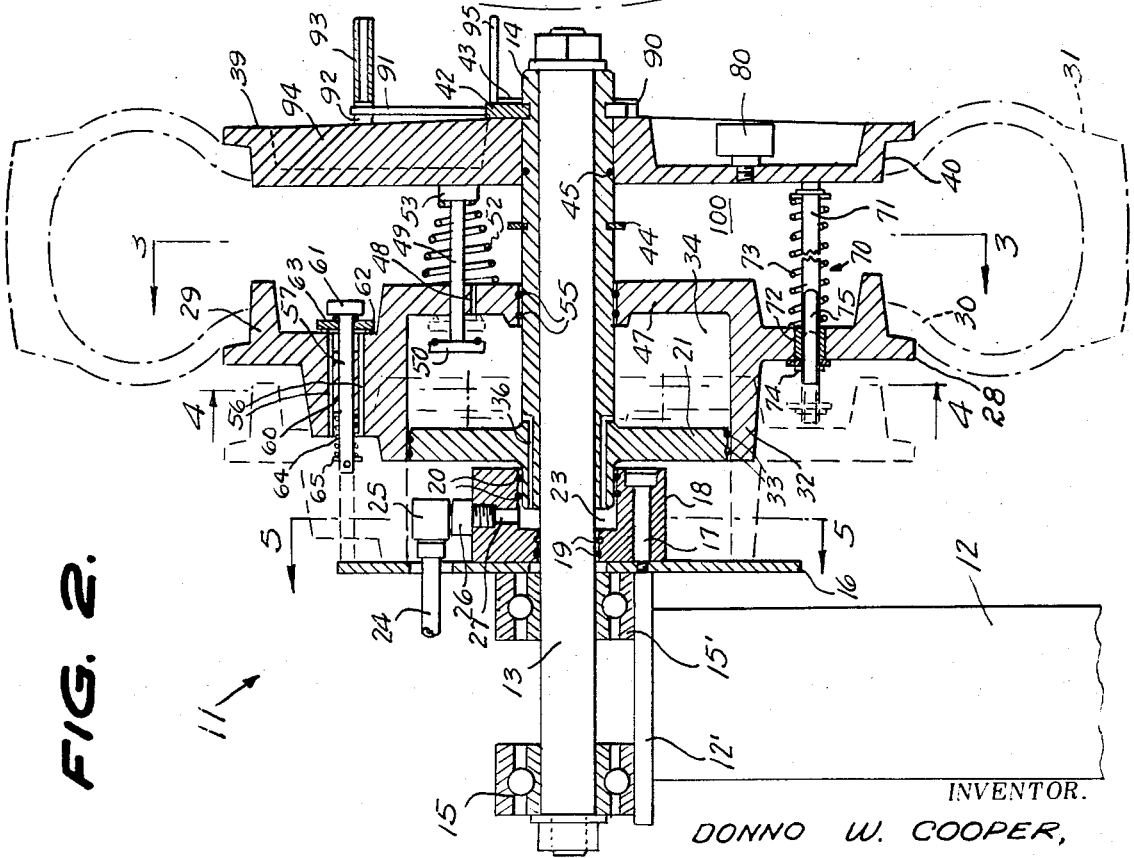
FIG. 2 is a transverse vertical cross-sectional view taken substantially on the line 2—2 of FIG. 1.
Figure 3:
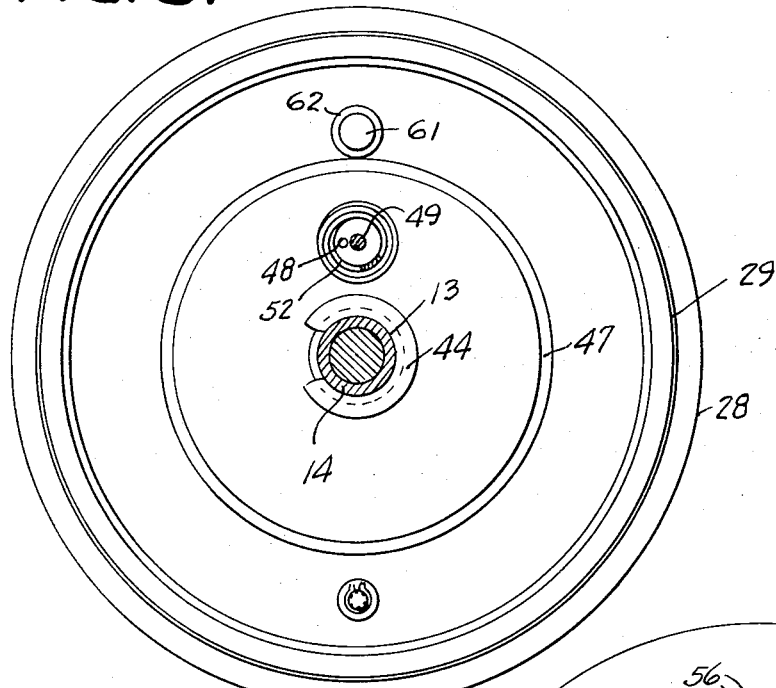
FIG. 3 is a vertical cross-sectional view taken substantially on line 3—3 of FIG. 2.

A sleevelike mandrel 14 is mounted on supporting shaft 13. As shown in FIG. 2, the rear end of the mandrel 14 is sealingly received in the annular cup member 18, said rear end being sealed relative to the inside bore of the cup member by annular conventional O-rings 20 similar to the sealing rings 19. Rigidly secured on the rear portion of the mandrel 14 is an enlarged piston disc 21.

As shown in FIG. 2, a clearance space 23 is defined between the rear end of mandrel 14 and the recess of cup member 18 to allow the transmission of air under pressure therethrough. A compressed air supply and venting conduit 24 is connected to the space 23, for example, by means of a conventional elbow fitting 25 and a conduit fitting 26 which communicates with the space 23 by way of a passage 27 formed in the wall of the cup member 18.

Designated at 28 is a rear disc member which is provided with a peripheral flanged tire bead-engaging portion 29 adapted to be received in a bead 30 of a conventional tire, shown in dotted view in FIG. 2. The disc member 28 is further integrally formed with a cylinder portion 32 which slidably and sealingly receives the piston disc member 21, being sealed relative to the inside bore of the cylinder 32 by means of sealing rings 33. The sealing rings 33 are mounted in the circumference of the disc 21, said rings sealingly and slidably engaging the inside bore of the cylinder member 32. Thus, the cylinder member 32 and the disc member 21 define an expansible and contractible piston chamber 34.

The rear portion of the mandrel 14 is formed with passages 36 connecting the clearance space 23 to the cylinder chamber 34. Thus, when compressed air is admitted into space 23 from conduit 24, the air is transmitted through the passages 36 to the space 34, whereby the space 34 tends to expand, for example, whereby the disc member 28 will move from the dotted view position thereof, as shown in FIG. 2, to the full-line view position thereof, as will be presently explained.

Designated at 39 is a front tire bead-engaging disc member formed with an annular peripheral bead-receiving seat 40, similar to that provided on the member 28, the Bead-receiving seats being in opposing relationship, as shown in FIG. 2.

The front disc member 39 is rotatably and sealingly mounted on the mandrel 14, being restrained against movement on the mandrel by the provision of a removable stop key 42 which is generally U-shaped and which is lockingly received in annular groove 43 formed on the front end portion of the mandrel 14, as is clearly shown in FIG. 2. Forward movement of the rear disc member 28 is limited by the provision of a stop ring 44 mounted on the mandrel 14 a short distance rearwardly from the forward limiting position of the front disc member, allowing forward axial movement of the rear disc member 28 but preventing the rear member from blowing off.

As shown in FIG. 1, the front disc member is provided with parallel opposing recessed guide channels 90,90 slidably receiving the side edges of the stop key 42. The bight portion of the stop key 42 is further provided with a longitudinally extending guide pin 91 which is slidably received in an aperture 92 of a guide post 93 secured to a rib 94 of disc member 39 and extending parallel to the mandrel 14. A handle pin 95 is likewise rigidly secured to the bight portion of key 42, said handle pin extending horizontally, namely, parallel to the post member 93. The handle member 95 may be employed for manually moving the stop key 42 into and out of locking position. Thus to unlock the key it is merely necessary to move the handle pin 95 to a position adjacent to the post member 93.

This permits the front disc member 39 to be removed from the mandrel 14, if so desired. The front disc member 39 may be replaced and restored to the position thereof shown in FIG. 2 and held in said position by following a procedure the reverse to that above described, namely, by returning the key 42 to the locking position thereof shown in FIGS. 1 and 2.

As shown in FIG. 2, the front disc member 39 is slidably mounted on the mandrel 14 and is sealed relative to the mandrel by the provision of a sealing ring 45 mounted in an annular groove provided therefor on the mandrel and engaging the central bore of front disc member 39.

The rear disc member 28 has an inner bore portion 47 which is provided with a port 48 and a valve rod 49 slidably engaged through the wall element 47 adjacent to port 48, as shown in FIG. 2. Rod 49 is provided at its inner end with a valve head 50 sealingly engageable with the wall 47 around the port 48 and biased toward sealing position by a coiled spring 52 surrounding the outer portion of rod 49 and bearing between an abutment head 53 on the rod 49 and the front surface of the wall 47. The forward end of the spring 52 may be suitably secured to the rod 49 and the abutment head 53 may be omitted, if so desired. Therefore, as will be apparent from FIG. 2, when the rear disc member 28 moves forwardly from its dotted view position toward its full-line position, the front disc 39 will act on the valve stem 49 at a predetermined point in the forward movement of the rear disc 28, exposing the port 48 to the space 34 and allowing air to pass through said port to the interior of a tire 31, as will be presently explained.

The valve element 51 of stem 49 is normally in sealing position with respect to wall element 47. The rear disc member 28 is rotatably and slidably disposed on the mandrel 14, being sealed relative thereto by the provision of a pair of resiliently deformable sealing rings 55,55 mounted in annular grooves formed in the central bore of wall element 47 and sealingly and slidably engaging mandrel 14.

Figure 4:
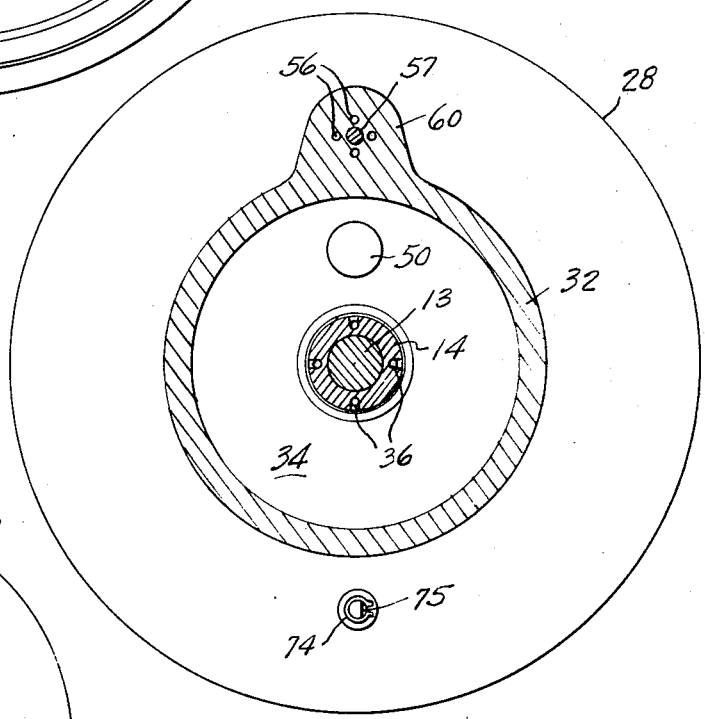
FIG. 4 is a vertical cross-sectional view taken substantially on the line 4—4 of FIG. 2.
Figure 5:
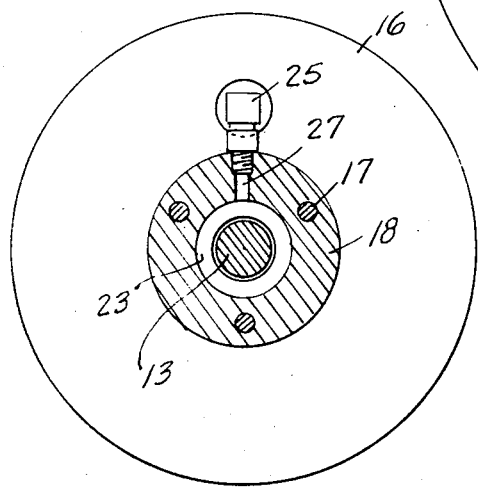
FIG. 5 is a vertical cross-sectional view taken substantially on line 5—5 of FIG. 2.

The outer portion of the rear disc member 28 is provided with another valve defined by vent ports 56 distributed around a valve rod 57 slidably engaged in a boss portion 60 formed in the wall of the disc member. For example, there may be four ports 56 spaced at 90° around the axis of the valve rod 57, as shown in FIG. 4. The rod 57 is provided at its forward end with a head portion 61 acting against an annular valve ring 62 which is provided with an annular sealing ring 63, sealingly engageable against the front surface of the outer wall portion of the disc member 28 surrounding the ports 56. The rear end of valve rod 57 is provided with a transverse stop pin 65 and a biasing spring 64 surrounds the rear portion of the rod 57, the front end of the spring being received in a suitable recess provided therefor in boss 60 and the rear end of the spring bearing against the transverse stop pin 65. Thus, spring 64 biases valve rod 57 toward the position thereof shown in full-line view in FIG. 2, wherein the ports 56 are sealed relative to the atmosphere. As will be presently explained, when the rear disc 28 moves rearwardly, the rear end of rod 57 will engage the plate 16 and expose the ports 56 to the atmosphere, allowing the interior of a tire 31 to be vented at that time.

The sealing valve head element defined at the right end of the rod 57, as viewed in FIG. 2, moves with the rod 57 when the rod engages the plate 16, allowing the interior of an inflated tire to be vented to atmosphere through ports 56.

In operation, the front disc 39 is first removed by disengaging the U-shaped stop plate 42 in the manner above described. A tire is then placed on the device with its bead receiving the peripheral portion 29 of the rear disc 28. The front disc 39 is then replaced on the mandrel 14 and the locking plate 42 is reengaged in the annular groove 43. Compressed air is then admitted through the conduit 24 into the space 23, from which it passes by way of passages 36 into the cylinder space 34. This causes the space 34 to expand, moving the rear disc member 28 forwardly and causing the front bead of the tire to be engaged on the seat 40 of front disc 39. As the beads of the tire are engaged on seat 40 of the front disc 39 and seat 29 of the rear disc member 28, a secondary chamber is formed, designated at 100, defined by these disc elements and the tire.

At a predetermined point in the forward movement of the rear member 28, the valve rod 49 engages the front disc member 39, causing the interior of the tire, shown at 100, to be placed in communication with the piston space 34 through the passage 48. The compressed air of space 34 therefore flows into the space 100 and inflates the tire. The volume of space 100 is greater than the volume of space 34. When the pressure in the tire becomes sufficient to overcome the pressure pushing the disc member 28 forwardly, disc member 28 begins to retreat rearwardly. When the disc member 28 moves rearwardly sufficiently to allow valve element 50 to close the port 48, the compressed air supply to the interior of the tire is cut off. At this point the pressure in the tire develops a force which balances the force exerted on the rear disc member 28 by the pressure in the space 34.

With the tire thus inflated, the desired operation may be performed thereon, and the tire will be securely held in an inflated condition whereby the operations thereon may be quickly and efficiently performed.

When it is desired to remove the tire from the chucking device, the conduit 24 is disconnected from the compressed air supply and it is vented to atmosphere. This may be accomplished by the provision of a suitable conventional selector valve provided in the supply line to which conduit 24 is connected. The venting of conduit 24 allows the air from space 34 to be exhausted to the atmosphere, allowing the air in the inflated tire 31, which is under working pressure, to move the rear disc member 28 rearwardly, eventually causing the end of valve rod 57 to engage the plate member 16. This vents the interior of the tire to atmosphere through the ports 56, causing the tire to be rapidly exhausted. Thereafter, the U-shaped stop plate 42 is unlocked in the manner above described, allowing the front disc member to be disengaged from the mandrel 14 and allowing the tire to be removed from the device. The apparatus is now ready for a repetition of the above-described procedure, using another tire. Tires of different sizes may be employed by using suitable extensions on the respective rear and front disc members 28 and 39.

In order to obtain an exact centering of a mounted tire 31, the air seals between the primary pressure chamber 34 and the secondary pressure chamber 100 must be perfect, which as a practical matter, is very difficult to accomplish. Therefore, the apparatus of the present invention provides for some leakage between the two chambers, through the provision of a "positioning valve," designated generally as 70, which is closed when the tire is in the desired position and which opens, allowing air to pass from the secondary chamber 100 to atmosphere if the rear bead plate 28 begins to move rearward because of a minor amount of air leaking from the primary chamber 34 to the secondary chamber 100, thus preventing this rearward movement of the rear bead plate 28 and keeping the tire exactly centered at a predetermined point. Thus, as shown in FIG. 2, the valve 70 comprises a valve rod 71 slidably engaged in a bushing 72 mounted in member 28 and biased to the right, as viewed in FIG. 2, by a coiled spring 73. The outer end of the rod 71 is provided with a stop ring 74 which limits the inward movement of the rod. The rod is provided with a flat portion 75 of limited length which connects space 100 to atmosphere when the rod is in a position such that an intermediate portion of flat 75 is adjacent the bushing 72. The right end of rod 71 is engageable by the front disc member 39 to move the rod 71 to the dotted view position thereof relative to bushing 72, which provides a seal between rod 71 and bushing 72, namely, which closes the valve 70. The full-line position of the valve 70, shown in FIG. 2, illustrates an open condition of the valve.

The positioning valve device 70 allows for the continued use of the machine, even though its O-rings or valve seats become worn.

The positioning valve device 70 does not interfere with the normal reaction to any major change in air pressure in the tire which would cause the dumping of the air therein by the operation of the dump valve 57.

As shown in FIGS. 1 and 2, a conventional pressure gauge 80 may be mounted on the forward disc member 39 so as to provide an indication of the pressure in the space 100 at any time.

While a specific embodiment of an improved air-operated tire chucking device has been disclosed in the foregoing description, it will be understood that various modifications within the spirit of the invention may occur to those skilled in the art. Therefore, it is intended that no limitations be placed on the invention except as defined by the scope of the appended claims.

What is claimed is:

1. A tire chucking device comprising a support including a mandrel, a rear disc member slidably mounted on said mandrel and having an annular forwardly facing tire bead seat on its rim, a forward disc member having a rearwardly facing tire bead seat on its rim, the tire bead seats opposing each other and being sealingly engageable with the respective beads of a tire disposed between the disc members, means to maintain said forward disc member in concentric alignment with the rear disc member, expansible chamber means operatively connected to the rear disc member and including means to move the rear disc member forwardly responsive to admission of fluid pressure thereto, a source of pressure fluid connected to said expansible chamber means, normally closed tire inflation valve means between said expansible chamber means and the space between said disc members, and means opening said valve means responsive to the forward movement of the rear disc member to a predetermined spacing relative to said forward disc member, whereby to communicatively connect said expansible chamber means to the interior of a tire engaged by said tire bead seats as a result of expansion of said expansible chamber means and to admit pressure fluid into the interior of the tire.

2. The tire chucking device of claim 1, and wherein said expansible chamber means is located rearwardly of said rear disc member between said rear disc member and said support.

3. The tire chucking device of claim 1, and wherein said expansible chamber means comprises a fluid pressure cylinder between the rear disc member and the support.

4. The tire chucking device of claim 3, and wherein said fluid pressure cylinder is substantially coaxial with the mandrel.

5. The tire chucking device of claim 3, and wherein said fluid pressure cylinder comprises a cylinder carried by the rear disc member and a piston element mounted on the mandrel and being sealingly and slidably engaged in the cylinder.

6. The tire chucking device of claim 3, and wherein said fluid pressure cylinder comprises a cylindrical chamber coaxially formed in the rear disc member and a piston element coaxially mounted on the mandrel and being sealingly and slidably engaged in said cylindrical chamber.

7. The tire chucking device of claim 6, and wherein said cylindrical chamber has a forward transverse wall portion facing the forward disc member.

8. The tire chucking device of claim 7, and wherein said tire inflation valve means is mounted on said transverse wall portion.

9. The tire chucking device of claim 8, and wherein said tire inflation valve means comprises a port formed in said transverse wall portion, a valve mounted adjacent said transverse wall portion and being at times engageable with said forward disc member, the valve normally closing said port, and means opening said port when the valve engages said forward disc member.

10. The tire chucking device of claim 9, and normally closed vent valve means on the rear disc member adjacent the space between the disc members, and means to open said vent valve means responsive to the exhausting of said cylindrical chamber while an inflated tire is operatively engaged on the tire bead seats of the rear and front disc members.

11. The tire chucking device of claim 10, and wherein said vent valve means comprises means defining a vent port in the rear disc member, and a vent valve mounted so as to open and close said port in response to changes in the lateral positioning of said rear disc member.

12. The tire chucking device of claim 1, and normally closed positioning vent valve means on the rear disc member normally engaging said forward disc member, and means opening said positioning vent valve means to atmosphere responsive to rearward movement of said rear disc member away from said forward disc member caused by leakage from said expansible chamber means into the interior of a tire engaged between the disc members, whereby to insure centering of the tire.

* * * * *